March 16, 1943.   V. W. KRAUSE   2,313,879
EYEGLASS
Filed March 1, 1941
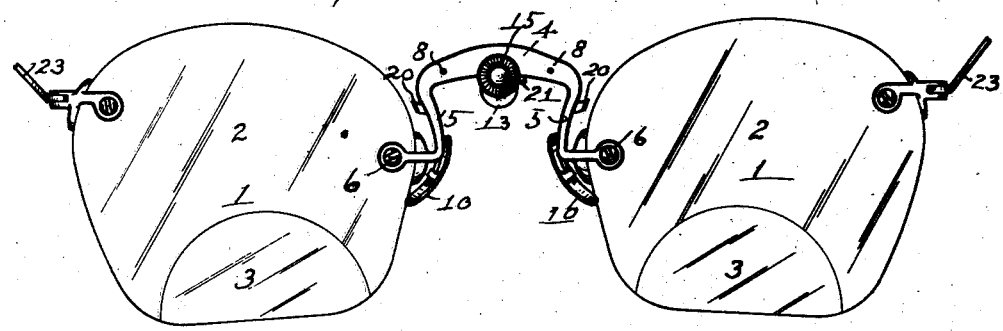
Fig. 1.
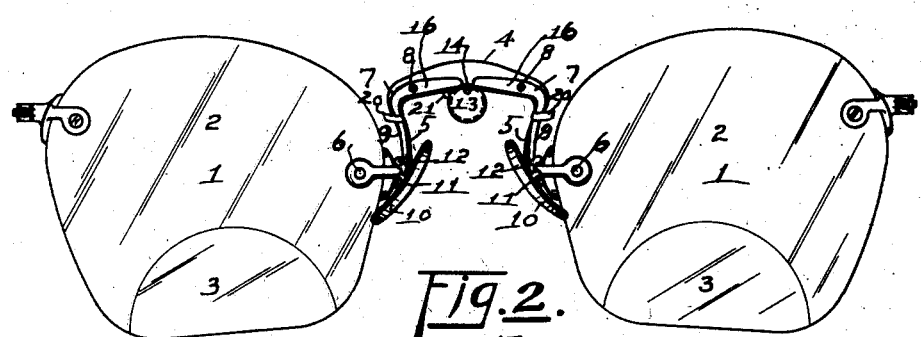
Fig. 2.
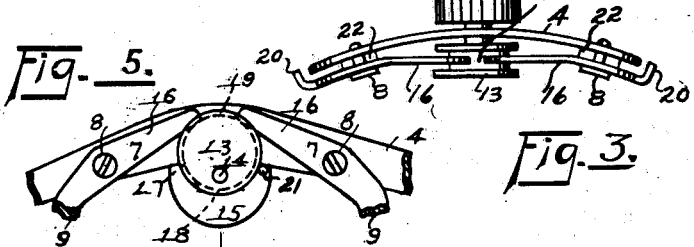
Fig. 3.
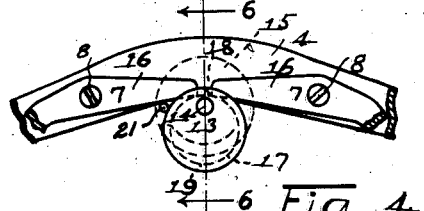
Fig. 5.
Fig. 4.
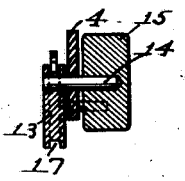
Fig. 6.
Witness:
Geo L. Chapel
Inventor
Victor W. Krause
By Rice and Rice
Attorneys Patented Mar. 16, 1943

2,313,879

UNITED STATES PATENT OFFICE 2,313,879

EYEGLASS

Victor W. Krause, Rockford, Mich., assignor of one-third to Harold R. Farrell, Rockford, Mich., and one-third to Ernest A. Shellman, Grand Rapids, Mich.

Application March 1, 1941, Serial No. 381,231

13 Claims. (Cl. 88—49)

The present invention relates to eyeglasses, particularly bifocal eyeglasses having upper and lower lenses; and its object is to provide an eyeglass structure having improved means for adjustably supporting the structure at different heights suitable for vision through said lenses respectively.

This and any other and more specific objects hereinafter appearing are attained by, and the invention finds preferable embodiment in, the illustrative structure particularly described in the body of this specification and illustrated by the accompanying drawing, in which:

Figure 1 is a front view of an eyeglass structure embodying my invention;

Figure 2 is a rear view thereof;

Figure 3 is a top plan view of the middle portion of the same;

Figure 4 is an enlarged rear view of the same;

Figure 5 is an enlarged rear view of the same, showing the parts in another position;

Figure 6 is a sectional view of the same taken on line 6—6 of Figure 4.

The eyeglass structure illustrated by the drawing includes a pair of bifocal glasses 1 having upper and lower lenses 2, 3 for distant vision and near or reading vision respectively, these glasses being connected by a U-shaped yoke or bridge 4 whose downwardly extending legs 5 are fastened to edge portions of the glasses by any suitable means as the screws 6 passing therethrough and through the bifurcated extremities of the legs.

A pair of members are mounted for relatively swinging movement on the rear side of the bridge, these members as illustrated being levers 7 fulcrumed on the bridge by pivot pins 8 threaded thereinto. The lower arms 9 of the levers have parts, the pads 10, adapted to engage the opposite sides respectively of the wearer's nose for supporting the structure thereon, the pads being mounted for universal pivotal movement on the arms 9 by any suitable connections as indicated at 11, 12 in Figure 2.

An element mounted for movement manually on the bridge is provided for swinging these lever members to adjusted positions. In the construction illustrated, this element, the cam wheel 13, is rotatable and is mounted on the rear side of the bridge, its eccentric pivot pin 14 passing through the bridge and having at the bridge's front side a knob handle 15 for rotating said element.

The horizontally extending and mutually approaching upper arms 16 of the levers operatively bear on element 13, engaging in its eccentric cam groove 17, so that when the knob 15 is manually turned counter-clockwise in Figure 1 to the position shown in Figures 1, 2 and 4, the levers' upper arms 16 may engage the lowest point 18 of the cam groove and the levers' lower arms 9 may spread apart in order that the pads 10 will engage a lower and comparatively wider portion of the wearer's nose thus supporting the structure at a low level suitable for distant vision through the upper lenses 2; but when the knob is turned clockwise in Figure 1 to carry the highest point 19 of the cam groove to its uppermost position seen in Figure 5, the levers' upper arms are thereby raised and the lower arms are made to approach each other to the position wherein the structure is supported at a higher level and on a comparatively narrower portion of the wearer's nose, thus suitable for near or reading vision through the lower lenses 3.

The levers may be provided with stop portions 20 which by engaging the bridge's legs 5 limit the mutually approaching movement of the levers' lower arms and the pads carried thereby; and the rotatable element 13 is provided with a stop portion 21 which by engaging the bridge in the positions seen in Figures 4 and 5 limits this element's rotating movement in opposite directions respectively.

Washers 22 of somewhat resilient material surrounding the pivot pins 8 and disposed between the bridge and the levers as shown in Figure 3 may be provided, the friction of which washers on the levers may be adjusted by turning these threaded pivot pins, to thus brake the turning movement of the levers and prevent noise and rattling occasioned thereby.

Temple bows 23 for the glasses should be provided for additionally or more securely supporting the eyeglass structure. The bridge and levers are desirably made of metal bendable into set forms for adjusting the structure to the requirements of individual wearers.

It will be seen that this eyeglass structure may be readily changed to the uses of distant and near or reading vision by merely rotating the knob 15.

It will be seen that, in supporting this eyeglass structure, said "parts" or pads 10 of said "members" or levers 7 rest on a narrower or a wider portion (as the case may be) of the wearer's nose as on a ledge or shelf rather than as being pressed by springs or otherwise against said portion pinched between them, as in glasses of the "pince nez" type. Discomfort and irritation are thus avoided; and the operation and function of the manually movable "element" (the rotatable cam 13) in either of its oppositely moved or turned positions is to hold the pads against separating movement from that predetermined position wherein they supportingly engage that portion— the narrower or the wider portion—of the nose so as to rest thereon as on a shelf rather than as in pince nez glasses.

The lever arms 9 and their pads may be freely movable toward each other and may be freely movable from each other until stopped by the stop member 21 engaging the bridge in either movement of the cam wheel to hold the pads from separation beyond such predetermined operative positions; and further, the structure having been made to meet the requirements of a particular wearer, it is not necessary for him to do anything more than to turn the cam wheel's knob 15 one way or the other to the cam wheel's stopped position wherein the glasses are adjusted to the position for distant or near vision respectively; and he need only apply the structure, thrusting his nose between the pads and thus pushing them apart to their said stopped position; and in changing the structure to higher or lower position on the nose, it is not necessary to remove the structure but merely to grasp the knob 15, raise or lower the structure and turn the button half around either way until it stops, all by the same manual operation.

The invention being intended to be pointed out in the claims, is not to be limited to or by details of construction of the particular embodiment thereof illustrated by the drawing or hereinbefore described.

I claim:

1. In an eyeglass structure of the class described which includes a pair of glasses having upper and lower lenses and a bridge connecting the glasses, a pair of members mounted on the bridge for relatively swinging movement and having parts adapted to engage opposite sides respectively of the wearer's nose for supporting the structure thereon, and manually operable forwardly-rearwardly extending means pivoted on the bridge operatively engaging said members for swinging the same to adjusted position.

2. In an eyeglass structure of the class described which includes a pair of glasses having upper and lower lenses and a bridge connecting the glasses, a pair of members mounted on the bridge for relatively swinging movement toward and from each other to vary the distance between their hereinafter mentioned parts and having parts adapted to engage opposite sides respectively of the wearer's nose for supporting the structure thereon at comparatively wider or narrower portions thereof, and manually rotatable means on the bridge operatively engaging said members for swinging the same to adjusted position.

3. In an eyeglass structure of the class described which includes a pair of glasses having upper and lower lenses and a bridge connecting the glasses, a pair of lever members fulcrumed on the bridge for relatively turning movement toward and from each other to vary the distance between their hereinafter mentioned parts and having arms with parts adapted to engage opposite sides respectively of the wearer's nose for supporting the structure thereon at comparatively wider or narrower portions thereof, and a manually rotatable cam element on the bridge on which element the other arms of the lever members bear for operatively turning the lever members by the rotation of said element to their adjusted position.

4. In an eyeglass structure of the class described which includes a pair of glasses having upper and lower lenses and a bridge connecting the glasses, a pair of lever members fulcrumed on the bridge for relatively turning movement toward and from each other to vary the distance between their hereinafter mentioned parts and having arms with parts adapted to engage opposite sides respectively of the wearer's nose for supporting the structure thereon at comparatively wider or narrower portions thereof, and a manually rotatable element on the bridge having an eccentric groove in which the other arms of the lever members bear for operatively turning the lever members by the rotation of said element to their adjusted position.

5. In an eyeglass structure of the class described which includes a pair of glasses having upper and lower lenses and a bridge connecting the glasses, a pair of lever members fulcrumed on the bridge for relatively turning movement toward and from each other to vary the distance between their hereinafter mentioned parts and having arms with parts adapted to engage opposite sides respectively of the wearer's nose for supporting the structure thereon at comparatively wider or narrower portions thereof, and a manually rotatable cam element on the bridge on which element the other arms of the lever members bear for operatively turning the lever members by the rotation of said element to their adjusted position, the lever members having stops adapted to engage the bridge for limiting the approaching movement of the levers' second mentioned arms.

6. In an eyeglass structure of the class described which includes a pair of glasses having upper and lower lenses and a bridge connecting the glasses, a pair of lever members fulcrumed on the bridge for relatively turning movement toward and from each other to vary the distance between their hereinafter mentioned parts and having arms with parts adapted to engage opposite sides respectively of the wearer's nose for supporting the structure thereon at comparatively wider or narrower portions thereof, and a manually rotatable element on the bridge having an eccentric groove in which the other arms of the lever members bear for operatively turning the lever members by the rotation of said element to their adjusted position, and said element having a stop adapted to engage the bridge for limiting its rotative movement in either direction.

7. In an eyeglass structure of the class described which includes a pair of glasses having upper and lower lenses and a bridge connecting the glasses, a pair of members mounted on the bridge for relatively swinging movement toward and from each other to vary the distance between the hereinafter mentioned pads and having pads mounted thereon for universal pivotal movement and adapted to engage opposite sides respectively of the wearer's nose for supporting the structure thereon at comparatively wider or narrower portions thereof, and manually rotatable means on the bridge operatively engaging said members for swinging the same to adjusted position.

8. In an eyeglass structure of the class described which includes a pair of glasses having upper and lower lenses and a bridge connecting the same, a pair of members mounted on the bridge for relatively swinging movement toward and from each other to vary the distance between their hereinafter mentioned parts and having parts adapted to engage opposite sides respectively of the wearer's nose at comparatively wider or narrower portions thereof, and rotatable means on the bridge having a forwardly extending handle for rotating the same, said means operatively engaging said members for swinging the same to adjusted position.

9. In an eyeglass structure of the class described which includes a pair of glasses having upper and lower lenses and a bridge connecting the glasses, a pair of members mounted on the bridge, at least one of said members being thus mounted for swinging movement toward and from the other member to vary the distance between their hereinafter mentioned parts, said members having parts adapted to engage opposite sides respectively of the wearer's nose for supporting the structure thereon at comparatively wider or narrower portions thereof, and manually rotatable means on the bridge operatively engaging said swingably mounted member for swinging the same to adjusted position.

10. In an eyeglass structure of the class described which includes a pair of glasses having upper and lower lenses and a bridge connecting the glasses, a pair of members mounted on the bridge for relatively swinging movement toward and from each other to vary the distance between their hereinafter mentioned parts and having parts adapted to engage opposite sides respectively of the wearer's nose at comparatively wider or narrower portions thereof, and a single rotatable means on the bridge having a forwardly extending handle for rotating the same, said means operatively engaging said members for swinging the same to adjusted positions in which they engage the wearer's nose at such wider or narrower portions thereof and also with greater or less pressure thereon.

11. In an eyeglass structure of the class described which includes a pair of glasses having upper and lower lenses and a bridge connecting the glasses, a device for supporting the structure alternately on higher and comparatively narrower and on lower and comparatively wider portions of the wearer's nose, said device comprising a cooperating pair of members having parts adapted to supportingly engage the opposite sides respectively of the nose at said portions thereof respectively and mounted on the bridge for movement to vary the distance between their said parts, and a manually operable element on the bridge operatively connected with said members for holding their said parts against separating movement from predetermined positions wherein their said parts operatively engage said portions respectively of the nose.

12. In an eyeglass structure of the class described which includes a pair of glasses having upper and lower lenses and a bridge connecting the glasses, a device for supporting the structure alternately on higher and comparatively narrower and on lower and comparatively wider portions of the wearer's nose said device comprising a cooperating pair of members having parts adapted to supportingly engage the opposite sides respectively of the nose at said portions thereof respectively and mounted on the bridge for movement to vary the distance between their said parts, and a manually rotatable element on the bridge operatively connected with said members for holding their said parts against separating movement from predetermined positions wherein their said parts operatively engage said portions respectively of the nose.

13. In an eyeglass structure of the class described which includes a pair of glasses having upper and lower lenses and a bridge connecting the glasses, a device for supporting the structure alternately on higher and comparatively narrower and on lower and comparatively wider portions of the wearer's nose, said device comprising a co-operating pair of members having parts adapted to supportingly engage the opposite sides respectively of the nose at said portions thereof respectively and mounted on the bridge for movement to vary the distance between their said parts, and a manually operable element on the bridge operatively connected with said members for holding their said parts against separating movement from positions wherein their said parts operatively engage said portions respectively of the nose, said element having a limited movement to positions wherein said parts of said members are held against separating movement from their positions wherein they engage said portions respectively of the nose.

VICTOR W. KRAUSE.